United States Patent
Duggins (10) Patent No.: US 10,140,219 B2
(45) Date of Patent: Nov. 27, 2018

(54) MULTI-PORT SHARED CACHE APPARATUS

(71) Applicant: BLACKBERRY LIMITED, Waterloo (CA)

(72) Inventor: Simon John Duggins, Cambridge (GB)

(73) Assignee: BlackBerry Limited, Waterloo, Ontario (CA)

( * ) Notice: Subject to any disclaimer, the term of this patent is extended or adjusted under 35 U.S.C. 154(b) by 189 days.

(21) Appl. No.: 13/667,895

(22) Filed: Nov. 2, 2012

(65) Prior Publication Data
US 2014/0129778 A1    May 8, 2014

(51) Int. Cl.
| | |
|---|---|
| G06F 12/08 | (2016.01) |
| G06F 12/126 | (2016.01) |
| G06F 12/084 | (2016.01) |
| G06F 12/123 | (2016.01) |

(52) U.S. Cl.
CPC .......... *G06F 12/126* (2013.01); *G06F 12/084* (2013.01); *G06F 12/123* (2013.01)

(58) Field of Classification Search
CPC .... G06F 12/0844; G06F 12/23; G06F 12/084; G06F 12/126; G06F 12/0223; G06F 12/123; H04N 21/2183
USPC ................................ 711/133–134, E12.022
See application file for complete search history.

(56) References Cited

U.S. PATENT DOCUMENTS

| | | |
|---|---|---|
| 4,317,168 A | 2/1982 | Messina et al. |
| 4,719,568 A | 1/1988 | Carrubba et al. |
| 5,611,071 A | 3/1997 | Martinez, Jr. |
| 5,671,444 A | 9/1997 | Akkary et al. |
| 5,682,500 A | 10/1997 | Vishlitzky et al. |
| 6,044,438 A | 3/2000 | Olnowich |

(Continued)

FOREIGN PATENT DOCUMENTS

| | | | |
|---|---|---|---|
| WO | 2007/001257 A1 | 1/2007 | |
| WO | WO 2007/001257 A1 * | 1/2007 | ....... G06F 2212/601 |

OTHER PUBLICATIONS

Lesage et al. ("PRETI: Partitioned Real-Time shared cache for mixed-criticality real-time systems" Submitted Jan. 20, 2012 [online], [retrieved on Sep. 26, 2014] Retrieved from HAL—Inria Open archive: <URL: http://hal.inria.fr/hal-00661687>) p. 5, 3rd ¶.*

(Continued)

*Primary Examiner* — Tracy A Warren
(74) *Attorney, Agent, or Firm* — Thomas Grzesik; Fleit Gibbons Gutman Bongini & Bianco P.L.

(57) ABSTRACT

An apparatus for use in telecommunications system comprises a cache memory shared by multiple clients and a controller for controlling the shared cache memory. A method of controlling the cache operation in a shared cache memory apparatus is also disclosed. The apparatus comprises a cache memory accessible by a plurality of clients and a controller configured to allocate cache lines of the cache memory to each client according to a line configuration. The line configuration comprises, for each client, a maximum allocation of cache lines that each client is permitted to access. The controller is configured to, in response to a memory request from one of the plurality of clients that has reached its maximum allocation of cache lines, allocate a replacement cache line to the client from cache lines already allocated to the client when no free cache lines in the cache are available.

20 Claims, 4 Drawing Sheets

(56) References Cited

U.S. PATENT DOCUMENTS

| | | | |
|---|---|---|---|
| 6,078,994 A * | 6/2000 | Carey | G06F 12/121 711/133 |
| 6,425,058 B1 * | 7/2002 | Arimilli | G06F 12/121 711/128 |
| 7,330,940 B2 * | 2/2008 | Bockhaus | G06F 12/0862 710/22 |
| 7,558,919 B1 * | 7/2009 | Yochai | G06F 12/0893 711/129 |
| 7,558,920 B2 * | 7/2009 | Mattina et al. | 711/133 |
| 7,746,856 B2 * | 6/2010 | Kam et al. | 370/389 |
| 8,131,931 B1 * | 3/2012 | Roberts | G06F 12/121 711/118 |
| 8,151,077 B1 * | 4/2012 | Bauer et al. | 711/170 |
| 2004/0205295 A1 * | 10/2004 | O'Connor | G06F 12/084 711/129 |
| 2007/0022143 A1 * | 1/2007 | Trask et al. | 707/200 |
| 2008/0007561 A1 | 1/2008 | Thompson | |
| 2008/0091880 A1 | 4/2008 | Vishin | |
| 2008/0313407 A1 | 12/2008 | Hu et al. | |
| 2010/0281216 A1 * | 11/2010 | Patel | G06F 12/121 711/118 |
| 2010/0281220 A1 | 11/2010 | Cantin et al. | |
| 2011/0010502 A1 * | 1/2011 | Wang | G06F 12/121 711/128 |
| 2011/0055827 A1 | 3/2011 | Lin et al. | |
| 2011/0238919 A1 * | 9/2011 | Gibson | G06F 12/084 711/133 |
| 2012/0079206 A1 * | 3/2012 | Zhao | H04L 67/2852 711/134 |

OTHER PUBLICATIONS

Extended European Search Report from related European Patent Application No. 12191143.2 dated May 31, 2013; 3 pages.
Canadian Office Action dated Mar. 7, 2017, received for Canadian Application No. 2,832,223.
Canadian Examiner's Report dated Jan. 10, 2018 for Canadian Application No. 2,832,223.

* cited by examiner

MULTI-PORT SHARED CACHE APPARATUS

FIELD OF THE DISCLOSURE

Related Application(s)

The present disclosure concerns an apparatus or system comprising a cache memory shared by multiple clients and a controller for controlling the shared cache memory.

BACKGROUND

In existing communication systems, it is common to use hardware accelerators or coprocessors for various processing functions that access a common or shared memory area. Most of the accelerators or coprocessors have critical real-time requirements on their accesses to the shared memory. The shared memory is therefore usually positioned on the same die as the accelerators or coprocessors to allow for very fast accesses (for example, 1 clock).

As data rates increase, for example, Long Term Evolution (LTE) Category 4 can have an aggregated throughput of 200 Mbits/s, the memory required also increases in order to maintain a desired system throughput. The physical memory size starts to become a prohibitive cost factor. It therefore becomes necessary to move the memory into external components that may have access times of 20-30 clocks or greater. Burst access is usually employed to enable the average access time for sequential data to be reduced.

In a communication device or system that has multiple clients (for example, 16 clients) which burst access an external memory, a local memory area is usually allocated to store and assemble the burst requests. Since this memory area is localized inside each client (for example, inside an acceleration block), it cannot be shared between the multiple clients. Thus, power and area (and therefore cost) is wasted in fetching data that may already have been read from the external memory. Data coherency also becomes a significant issue, which requires more power to be dissipated in writing data back to the memory so that another client can read it and an inter-lock mechanism may be required between different processing blocks. There is also considerable added complexity for each client in controlling the burst requests and hence more area and cost is incurred.

These problems can be solved by employing a centralized multi-port memory controller with a cache-based approach. Each client has straightforward, direct random access to the same coherent large virtual on-chip RAM space. This is implemented by using a cache memory, a minimal amount of real on-chip RAM, that provides indirect access to the large external memory space that may be accessed in bursts to maintain high performance A key issue to overcome with conventional cache allocation approaches is that the memory controller is multi-ported (e.g. 16 clients or more), which means that prioritized memory accesses from different clients are unlikely to maintain any spatial (sequential) coherency. This may cause significant problems to classic cache operations because spatial and/or temporal locality of access cannot be relied upon to prevent the discard of a given cache line. This may impact both system latency and system power consumption due to wasted memory access cycles caused by cache thrashing.

One way of solving this problem is to allocate much more memory size to the cache, but this is costly and wasteful.

BRIEF DESCRIPTION OF THE DRAWINGS

Reference is made below to the accompanying drawings in which.

DESCRIPTION

Reference is made below to one or more particular examples which are not intended to be limiting on the scope of the disclosure.

In a first aspect, an apparatus comprises a cache memory accessible by a plurality of clients; and a controller configured to allocate cache lines of the cache memory to each client according to a line configuration which comprises for each client a maximum allocation of cache lines, wherein the controller is configured to, in response to a memory request from one of the plurality of clients that has reached its maximum allocation of cache lines, allocate a replacement cache line to the client from cache lines already allocated to the client when no free cache lines are available.

The line configuration may comprise for each client a maximum allocation, such as a maximum allocation of cache lines that each client is permitted to access, use or own, which may be a maximum allocation specifically allocated to a client for access. The controller may be configured to allocate a replacement cache line to the client from cache lines already allocated to the client when no free cache lines in the cache are available, in response to a memory request from one of the plurality of clients that has reached its maximum allocation of cache lines.

The maximum allocation for each client may be configured based on the bandwidth. Alternatively, the maximum allocation is based on the access type requested by each client. The controller may be configured to apply different line replacement policies for different clients.

The controller may be configured to maintain a pool of free cache lines that can be accessed by any client that has reached its maximum allocation. The controller may be configured to selectively add an inactive cache line to the pool if the cache line has been inactive for a configurable period of time. The inactive cache line may not be added to the pool if the number of free cache lines in the pool has exceeded a threshold.

The controller may be configured to select a least recently used cache line from the cache lines already allocated to the client as the replacement cache line. Alternatively, the controller may be configured to select the replacement cache line from cache lines already allocated to the requesting client for the same access type as the present memory request. The aforementioned configurations for cache line selection may be referred to as a modified and improved line replacement policy (MLRU) which may encompass a general line replacement policy (LRU) and thus the MLRU may apply the general criteria and/or constraints of the LRU to cache line selection in conjunction with the MLRU. In one example, when more than one replacement cache line is identified by MLRU, then the final selection from this subset can be made using LRU.

In a second aspect, a system may comprise the apparatus described above along with a plurality of clients having shared access to the cache memory of the apparatus. The system may be user equipment in a telecommunications system, such as a mobile device, e.g. mobile electronic device, mobile phone, or portable computing device, e.g. laptop, tablet computer etc.

In a third aspect, a method of controlling a cache memory accessible by a plurality of clients, comprises: allocating cache lines of the cache memory to each client according to a line configuration which comprises for each client a maximum allocation of cache lines; and in response to a memory request from one of the plurality of clients that has reached its maximum allocation of cache lines, allocating a replacement cache line to the client from cache lines already allocated to the client when no free cache lines in the cache are available.

The line configuration may comprise for each client a maximum allocation of cache lines that each client is permitted to use, own, or have specifically allocated to it for access.

The method may comprise configuring the maximum allocation of cache lines for each client based on bandwidth or on the type of access request. The method may comprise applying different line replacement policies to different clients.

The method may comprise maintaining a pool of free cache lines and allocation one or more of the cache lines in the pool to any client of the plurality of clients that has exceeded its maximum allocation. The method may further comprise selectively adding a cache line to the pool if said cache line has been inactive for a configurable period of time.

The method may comprise maintaining said inactive cache line if the number of free cache lines in the pool has exceeded a threshold. The method may comprise selecting a least recently used cache line from cache lines already allocated to the requesting client as the replacement cache line. The method may comprise selecting the replacement cache line from cache lines already allocated to the requesting client for the same access type as the access request. The method may comprise selecting a least recently used cache line of the cache as a replacement cache line when the client has not reached its maximum allocation and when no free cache lines are available.

In a fourth aspect, a non-transitory computer readable medium can have computer executable instructions stored thereon which, when executed, perform the method mentioned above.

Figure 1:
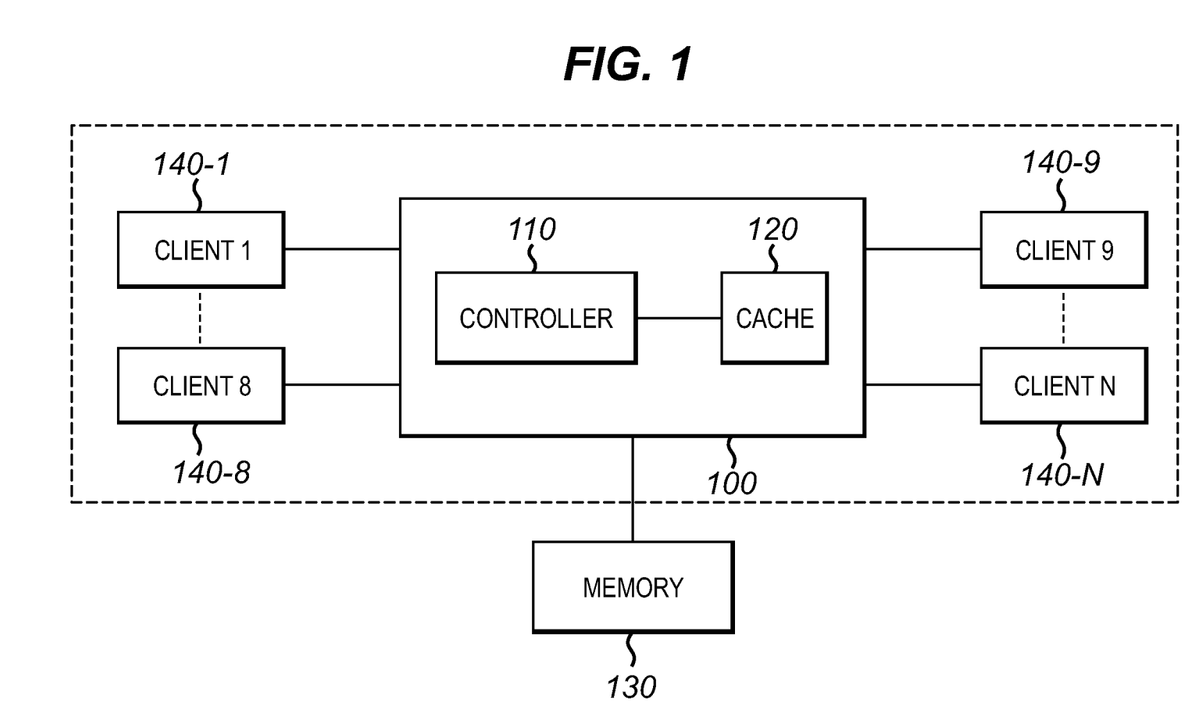
FIG. 1 is a diagram showing an example arrangement of a system according to the disclosure.

As shown in FIG. 1, a system comprises a cache memory 120 and a controller 110. The cache memory 120 is accessible by a plurality of clients or ports 140-1 to 140-N. That is, the cache memory 120 is shared by the multiple clients or ports and the controller is therefore multi-ported. In an example system, the cache memory 120 is shared by 16 clients.

The clients 140 may be hardware accelerators or processors. Each hardware accelerator or processor is specialized for a processing function or groups of functions, such as for video or graphic signal processing. The clients 140 may vary from a small accelerator unit to a large accelerator block. It should be appreciated that the present disclosure is not limited to hardware acceleration and may be used for software processing threads within a processing system.

The system may be user equipment (UE) in a telecommunications system, for example, such as a mobile device, e.g. mobile phone, or portable computing device, e.g. laptop, tablet computer etc. However, the present disclosure is not limited to such systems and may relate to any computing system which contains multiple clients, or multiple threads in a software implementation. The system may be adapted for use in a telecommunications system implementing one or more of the schemes defined by Global System for Mobile Communications (GSM), 3rd Generation (3G) mobile communication, 3rd Generation Partnership Project (3GPP) and Long Term Evolution (LTE).

The cache memory 120 comprises blocks of memory for storing copies of data from the frequently used large main memory 130 (such as a large DRAM). Each cache memory block is called a cache line. The cache memory 120 is a smaller and faster memory, and by storing data copies from the most likely used main memory locations, the average data access time is reduced and power dissipation is reduced. As shown in FIG. 1, the cache memory 120 is positioned on the same die or integrated circuit as the clients 140 (in dotted line) whilst the main memory 130 is part of external components. Alternatively, the cache memory 120, controller 110, main memory 130 and clients 140 may be all be positioned on separate dies or integrated circuits, or each of these components may be positioned on a particular die or integrated circuit with one or more of the other components, e.g. the controller 110 and cache 120 may be positioned on one die or integrated circuit, the clients 140 may be positioned on one or more separate (or different) dies or integrated circuits and the memory 130 position on yet a further separate (or different) die or integrated circuits.

When a memory request is made by a client, if the cache contains a copy of the requested memory entry (this is called a 'cache hit'), the data copy stored in the cache will be used. If the cache does not have a copy of the requested memory entry (this is called a 'cache miss'), a cache line will be used to store a copy of the requested entry in the cache and the data copy stored in the cache will be used for the present memory request and/or for future memory requests. When memory requests have high spatial and/or temporal locality, memory operation is greatly expedited. By "spatial locality", it is intended to mean that memory access addresses are sequential, or are to a restricted region of the memory (e.g. within 128 bytes). By "temporal locality", it is intended to mean that many memory accesses are made to the same region of memory within a given time-period. In a multi-port system, the spatial and/or temporal locality may be reduced since different clients may have quite distinct memory requests. However, memory requests from a same client are expected to exhibit spatial and/or temporal locality.

The cache memory 120 in the apparatus or system may be a fully-associative cache. That is, when a memory entry in the main memory is requested which does not have a copy in the cache, the data in the memory entry may be fetched to the cache in any one of the cache lines. A fully associative cache has a reduced cache miss rate. However, the present disclosure is not limited to fully associative caches. For example, the cache memory 120 may be a set-associative cache.

The controller 110 is configured to allocate cache lines to the multiple clients 140 according to a line configuration file. The configuration file comprises for each client a maximum allocation of cache lines, i.e. the maximum number of cache lines that a client is permitted to access. For example, the clients 140 may each have a maximum allocation of 16 cache lines. The maximum allocation can be configured by the user, hardware or software. For instance, the user can set the maximum allocation for each client at the start of operation of the controller 110, e.g. following a reset or power-on. The configuration may be maintained for a period of time (for example, not changed for a given hour, day or week), may be changed periodically or updated dynamically, or maintained until the next reset, or power-down.

The maximum allocation of each client may depend on the bandwidth. For example, a client that requires higher data rate may be permitted to use a larger proportion of the cache lines. Alternatively, the maximum allocation of each client may depend on the access type of the client. For example, if a client has more read access requests, it is permitted to use more cache lines than other clients that mainly have write access requests. Alternatively, each client may be allocated an equal proportion of the cache memory. Of course, other suitable criteria dependant on the desired application of the cache memory 120 may be used by the user to allocate cache lines to the multiple clients 140.

In accordance with one embodiment, each client is permitted to grab free cache lines in the cache memory until the client has reached its respective maximum allocation. Upon reaching its maximum allocation, the client has to discard its own cache lines, i.e. cache lines already used by the client, for the uncached memory request.

When a cache miss occurs, the controller 110 allocates a replacement cache line to the client according to a replacement policy or replacement algorithm. The replacement policy decides which cache line is to be discarded to make room for the new requested entry of the main memory so that a copy of the new entry can be stored in the cache memory 120. The discarded cache line is referred to as replacement line in the present application.

The difficulty that any replacement policy is facing is to predict which existing cache line is least likely to be used in the future. Least-recently used(LRU) is one of the most popular replacement policy. LRU replaces the least recently accessed line and therefore requires the cache controller to keep a track of frequency of usage for each cache line.

Figure 2:
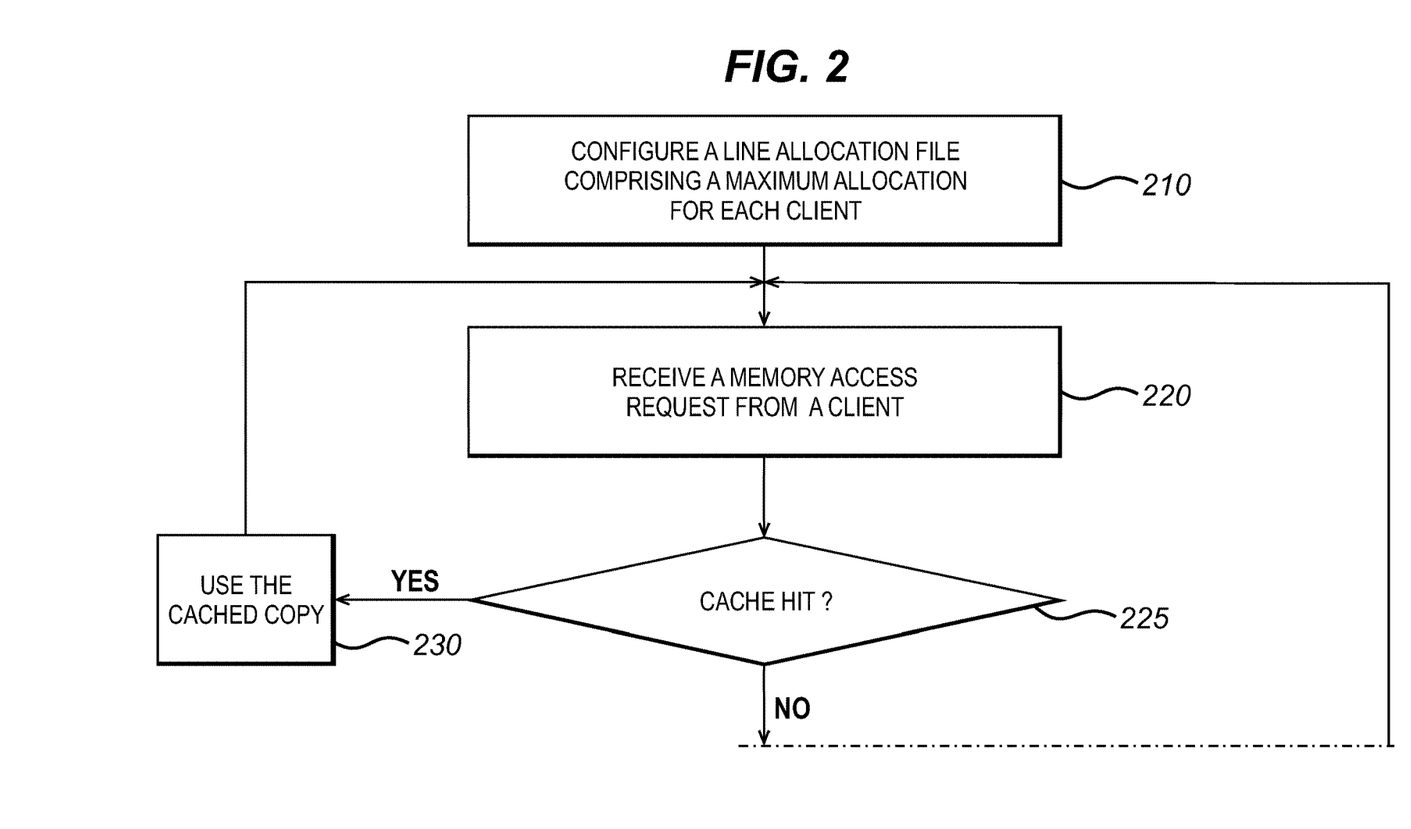
FIG. 2 is a flow diagram of an example method of controlling the cache memory shown in FIG. 1.

Control of the shared cache operation can be according to a new replacement policy, whereby FIG. 2 shows an embodiment of a method 200 of controlling a shared cache memory, for example, the cache memory 120 shown in FIG. 1. The controller 110 may be provided with or include a number of different line replacement policies. The user may configure which policy is to be used by the controller 110 for the multiple clients 140. The controller 110 may further be configured to use different replacement policies for different clients 140. According to an embodiment, the controller 110 is configured to selectively use a conventional LRU policy and a modified and improved line replacement policy that is particularly suitable for multi-port systems. The modified and improved line replacement policy is generically called MLRU (modified LRU) in this application for ease of reference. It will be appreciated that the modified replacement policy (MLRU) can encompass an existing LRU, e.g. when more than one replacement cache line is identified by MLRU, then the final selection from this subset can be made using LRU.

As shown in FIG. 2, the controller 110 has an access to a configuration file which specifies the maximum allocation of cache lines for each client 140-1 to 140-N (step 210). Upon receiving a memory access request (step 220) from a client, e.g. client 140-1, the cache memory 120 is searched for copy of the requested memory entry (step 225). If the requested memory copy is stored in the cache memory 120, i.e. a cache hit, the cached copy is used (step 230). For a read operation, the data in the cache is returned. For a write operation, the data is written into the cache which may be further written to the corresponding memory entry in the main memory 130. Otherwise, if the cache memory does not have a copy of the requested memory entry, a cache miss occurs and the controller will allocate a cache line to the client for the uncached memory request.

When a cache miss occurs, the controller 110 checks whether there are any free lines in the cache (step 240) and allocates a free line for the uncached memory request if one or more free lines are available (step 250). If all the lines are used, the controller 110 checks whether the client has reached its maximum allocation (step 260). If the client has not reached its maximum allocation, a cache line will be freed to make room for the uncached memory request. The cache line that is to be freed may be the least recently used (LRU) cache line of the cache memory (step 280). Otherwise, if the client has already reached its maximum allocation, the controller 110 will apply the MLRU replacement policy to allocate a replacement cache line for the uncached memory request (step 270). The cached copy will then be read/written according to the memory request (step 290).

The multiple clients may burst access the cache memory 120. Prioritized memory requests may be allowed. The controller 110 may sequentially process memory requests. Thus, following step 290, the operation is returned to step 220 for processing the next memory access.

Figure 3:
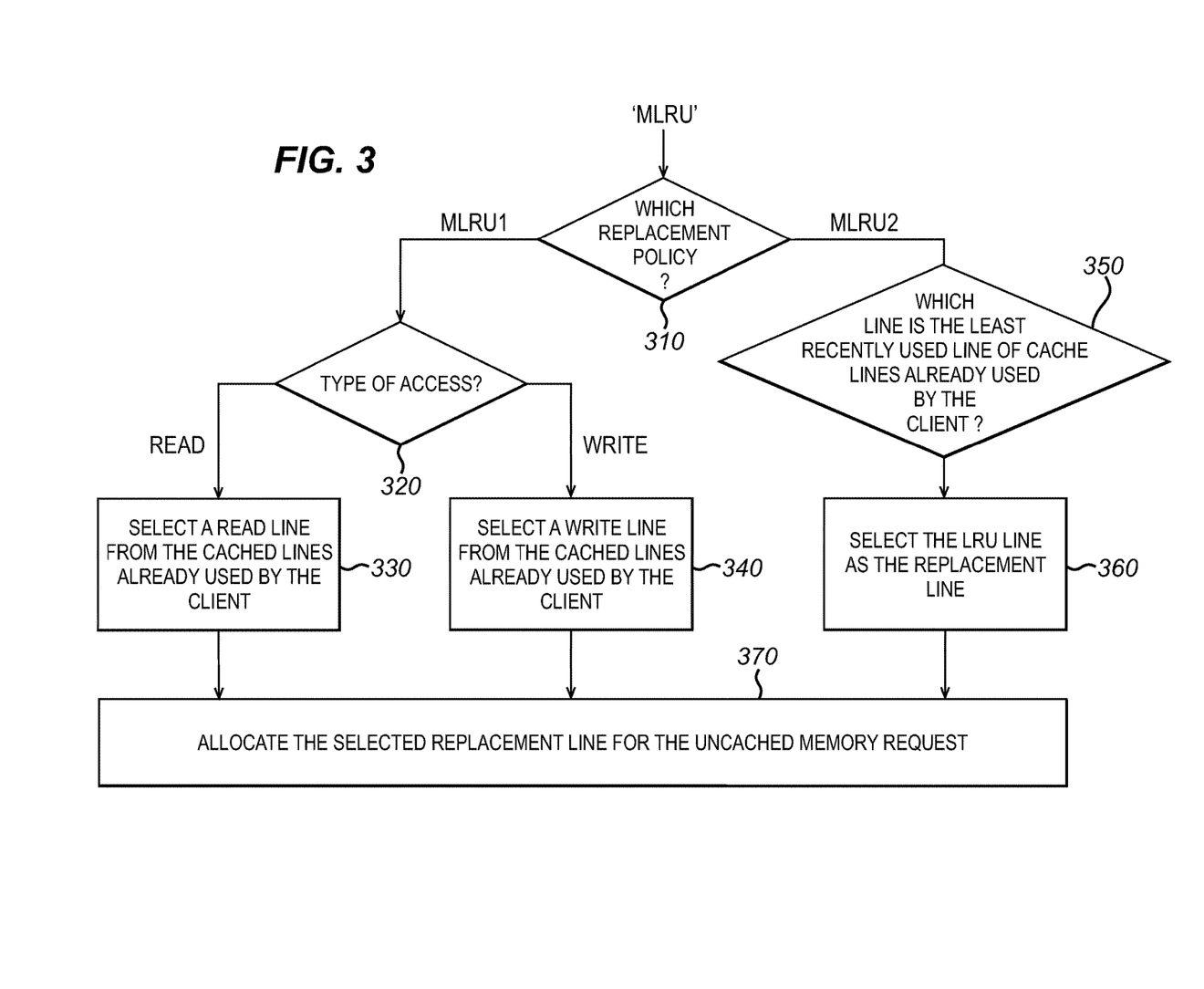
FIG. 3 is a flow diagram of an example line replacement policy.

At step 270, the controller 110 follows the MLRU replacement policy configured for the client. The replacement policy may be specially configured for individual clients or may be a common policy applicable to all the clients. FIG. 3 shows an example line replacement process 300, in which the controller 110 is configured to use the MLRU (modified LRU) replacement policy. A core requirement of the MLRU replacement policy is that the client can only be allocated with a replacement line from the cache lines already used by the client. When more than one replacement cache line is identified by MLRU, then the final selection from this subset can be made using LRU.

As shown in FIG. 3, the controller 110 is provided with two MLRU replacement options, MLRU1 and MLRU2. The controller 110 checks which MLRU replacement policy is configured to be used for the requesting client (step 310). The chosen MLRU policy may be applied as subset of a generic policy set by the LRU. If the MLRU1replacement policy is applied, the controller checks the type of new access request (step 320). If the new access request is a read operation, the controller 110 will select a read line from the cache lines already used by the requesting client as the replacement line (step 330). If the new access request is a write operation, the controller 110 will select a write line from the cache lines already used by the requesting client as the replacement line (step 340). The selected replacement cache line is then allocated to the client for the uncached memory request (step 370). If the MLRU2 replacement policy is applied, the controller will check which line is the least recently used line (LRU) among the cache lines already used by the client (step 350) and select the LRU line of the set as the replacement line (step 360). The selected replacement line is allocated to the client for the uncached memory request (step 370).

The embodiment shown in FIG. 3 checks the replacement policy for each client. Alternatively, all the clients may be configured to use the same replacement policy, MLRU1 or MLRU2. In that case, MLRU2 (or MLRU1) may be the default replacement policy and is routinely used for all the memory requests unless MLRU1 (or MLRU2) is given priority.

The MLRU1 replacement policy can be particularly efficient for clients that have high read/write activity locality. For example, a direct memory access (DMA) client doing sequential reads and writes will tend to only need a single cache line for reading and a single cache line for writing. The MLRU2 replacement policy is more suitable for random read/write clients. As mentioned above, different clients may be configured to use different replacement policies. For example, client 140-1 may be a DMA client and the controller is therefore configured to apply MLRU1 policy for client 140-1; client 140-9 may be a random read/write client and is therefore configured to apply MLRU2 policy. By configuring clients individually with respective replacement policy, the cache operation is further improved.

The controller monitors the cache line usage and tracks the number of lines used by each client and the number of free lines in the cache memory. The controller may also maintain a modified status of each cache line.

According to one embodiment, the controller 110 reserves a pool of free cache lines and allows clients that have reached their maximum allocation to access the free cache lines in the pool. For example, cache lines of the cache memory may be freed after a configurable period of inactivity (i.e. not accessed). This increases the efficiency of cache usage since otherwise unused lines would continue to stay with their allocated client. The pool may be updated periodically, for example, every a configurable period of time. Alternatively, the pool is updated dynamically based on inactivity of cache lines. For example, when a line has been inactive for a configurable period of time, e.g. 32, 64, 128, or 256 clocks or greater, the controller will mark this line as free. Each cache line may have a flag bit indicative of usage. The controller 110 may maintain a record of the free/empty status of each cache line. Before a cache line is set free, the data in the cache may be written back to the main memory 130 to maintain data coherence.

The controller 110 may check if the pool has reached a threshold, i.e. the maximum number of free lines that the controller 110 can maintain. This threshold may be configurable by the user. If the pool has enough free lines, i.e. exceeding the threshold, an inactive line is not freed and the data in that cache is not written back to the main memory. Accordingly, the cache is maintained for future request of the cached memory entry.

According to an embodiment, the controller 110 is configured to flush all the cache lines belonging to a selected client into the main memory 130. The configuration may be set and/or cleared by hardware. During the flushing process, accesses from the selected client are held off until the flush has completed. Alternatively or additionally, the controller 110 may be configured to flush a cache line corresponding to a specified memory entry in the main memory 130. The flushed cache line may be set free on completion of flush. Alternatively, the flushed cache line is maintained and not set free on completion.

The controller may be implemented by hardware, or by software embodied as computer program. The program comprises instruction codes that, when executed by a computer, perform the above-mentioned steps, processes and methods. The program may be contained in memory, such as read access memory (RAM), or read-only memory (ROM) and is executable by a processor connected to the memory, such as an embedded digital processor, or other programmable device such as, for example, an application-specific integrated circuit (ASIC).

By allocating each client a configurable maximum allocation, the cache memory is allocated to the clients based on their memory access requirements. This provides the user with a greater control of the cache operation. Prioritized memory access can be ensured. By allocating a replacement line to a requesting client from its own set, spatial and/or temporal locality of access can be relied upon to prevent the discard of a given cache line. The cache thrashing problem is minimized, thereby reducing the system latency and system power consumption, whilst minimizing the required cache memory size.

It will be appreciated that the invention has been described above by way of examples, and that modifications departing from the examples may be applicable within the scope of the disclosure.

The invention claimed is:

1. An apparatus comprising:
 a cache memory accessible by a plurality of processes; and
 a controller configured to allocate cache lines from a plurality of cache lines of the cache memory to each process of the plurality of processes according to a line configuration, the line configuration identifying for each process of the plurality of processes a maximum number of cache lines that are able to be utilized by the each process irrespective of free cache lines available in the plurality of cache lines, wherein a different maximum number of cache lines are identified for two or more processes of the plurality of processes, wherein each of the plurality of cache lines is able to be allocated to any process of the plurality of processes,
 wherein the controller is further configured to
  detect a first memory request from at least one process of the plurality of processes;
  allocate a cache line from the plurality of cache lines to the at least one process in response to detecting the first memory request, wherein a cache line from the plurality of cache lines is allocated to the at least one process for each memory request from the process until the maximum number of cache lines for the at least one process has been allocated, and wherein each cache line allocated to the at least one process from the plurality of cache lines is not associated with any type of memory request until the cache line is allocated to the at least one process,
  detect a second memory request from the at least one process, where the second memory request is detected subsequent to the first request;
  determine, in response to the second memory request being detected, that the at least one process has utilized its maximum allocation of cache lines, and
  in response to determining that the at least one process has utilized its maximum allocation of cache lines,
   determine that a plurality of cache line replacement policies is available;
   identify, from a configuration file associated with the at least one process, a cache line replacement policy from the plurality of cache line replacement policies configured for the at least one process, wherein the controller is configured to apply different line replacement policies concurrently to different processes; and
   allocate, in accordance with the identified cache line replacement policy, a replacement cache line to the at least one process only from a cache line currently allocated to and already used by the at least one process for a same type of memory request as the detected second memory request, whereby allocating the replacement cache line to the at least one process prevents the at least one process from exceeding its maximum allocation of cache lines irrespective of free cache lines available in the plurality of cache lines.

2. The apparatus of claim 1, wherein the maximum allocation of cache lines for each process is based on bandwidth.

3. The apparatus of claim 1, wherein the maximum allocation of cache lines for each process of the plurality of processes is based on a type of access requested by the each process.

4. The apparatus of claim 1, wherein the controller is configured to maintain a pool of free cache lines that can be accessed by any process that has not utilized its maximum allocation.

5. The apparatus of claim 4, wherein the controller is configured to selectively add an inactive cache line to the pool if the inactive cache line has been inactive for a configurable period of time.

6. The apparatus of claim 5, wherein the controller is configured to maintain the inactive cache line if the number of free cache lines in the pool has exceeded a threshold.

7. The apparatus of claim 1, wherein the controller is configured to select a least recently used cache line from cache lines already allocated to the at least one process as the replacement cache line.

8. The apparatus of claim 1, wherein the controller is configured to select a least recently used cache line of the cache as a replacement cache line when the at least one process has not utilized its maximum allocation and when no free cache lines are available.

9. A system, comprising:
the apparatus of claim 1, and
a plurality of processes having shared access to the cache memory of the apparatus.

10. The system of claim 9, wherein the system is user equipment in a telecommunications system.

11. A method of controlling a cache memory accessible by a plurality of processes, comprising:
accessing at least one line configuration identifying for each process of the plurality of processes a maximum number of cache lines that are able to be utilized by the each process irrespective of free cache lines available in a plurality of cache lines available to each process of the plurality of processes, wherein a different maximum number of cache lines are identified for two or more processes of the plurality of processes, and wherein a cache line is not associated with any type of memory request until the cache line is allocated to a process;
detecting a first memory request from at least one process of the plurality of processes;
allocating a cache line from the plurality of cache lines to the at least one process in response to detecting the first memory request, wherein a cache line from the plurality of cache lines is allocated to the at least one process for each memory request received from the at least one process until the maximum number of cache lines for the at least one process has been allocated, wherein each of the plurality of cache lines is able to be allocated to any process of the plurality of processes, and wherein the cache line is not allocated to the at least one process until requested by the at least one process;
detecting a second memory request from the at least one process, where the second memory request is detected subsequent to the first request;
determining, in response to detecting the second memory request, that all cache lines of the plurality of cache lines have been utilized;
determining, in response to all cache lines of the plurality of cache lines having been utilized, the process has utilized its maximum allocation of cache lines and each cache line in the plurality of cache lines has been utilized; and
in response to determining that all cache lines of the plurality of cache lines have been utilized and the process has utilized its maximum allocation of cache lines,
determining that a plurality of cache line replacement policies is available;
identifying, from a configuration file associated with the at least one process, a cache line replacement policy from the plurality of cache line replacement policies configured for the at least one process, wherein different cache line replacement policies are concurrently applied to two or more different processes of the plurality of processes; and
allocating, in accordance with the identified cache line replacement policy, a replacement cache line to the at least one process only from a cache line currently allocated to and already used by the at least one process for the type of memory request of the detected memory request, whereby allocating the replacement cache line to the at least one process prevents the at least one process from exceeding its maximum allocation of cache lines irrespective of free cache lines available in the plurality of cache lines.

12. The method of claim 11, comprising configuring the maximum allocation of cache lines for each process of the plurality of processes based on bandwidth.

13. The method of claim 11, comprising configuring the maximum allocation of cache lines for each process of the plurality of processes based on a type of access request.

14. The method of claim 11, comprising applying different line replacement policies to different processes.

15. The method of claim 11, comprising maintaining a pool of free cache lines that can be allocated to any process of the plurality of processes that has not exceeded its maximum allocation.

16. The method of claim 15, comprising selectively adding a cache line to the pool if the cache line has been inactive for a configurable period of time.

17. The method of claim 11, comprising selecting a least recently used cache line from cache lines already allocated to the at least one process as the replacement cache line.

18. The method of claim 11, comprising selecting a least recently used cache line of the cache as a replacement cache line when the at least one process has not utilized its maximum allocation and when no free cache lines are available.

19. A non-transitory computer readable medium having computer executable instructions stored thereon which, when executed, perform the method of claim 11.

20. The method of claim 11, further comprising:
maintaining a pool of free cache lines that can be accessed by any process that has not utilized its maximum allocation;
selectively adding an inactive cache line to the pool if the inactive cache line has been inactive for a configurable period of time; and
maintaining the inactive cache line if the number of free cache lines in the pool has exceeded a threshold.

* * * * *